(12) United States Patent
Ren

(10) Patent No.: US 8,881,964 B2
(45) Date of Patent: Nov. 11, 2014

(54) FRICTION STIR WELDING AND PROCESSING OF OXIDE DISPERSION STRENGTHENED (ODS) ALLOYS

(75) Inventor: Weiju Ren, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 398 days.

(21) Appl. No.: 12/887,056

(22) Filed: Sep. 21, 2010

(65) Prior Publication Data

US 2012/0070686 A1 Mar. 22, 2012

(51) Int. Cl.
| | |
|---|---|
| *B23K 20/12* | (2006.01) |
| *B23K 35/24* | (2006.01) |
| *C22C 38/00* | (2006.01) |
| *B23K 35/30* | (2006.01) |
| *C22C 38/28* | (2006.01) |
| *B23K 35/32* | (2006.01) |
| *B23K 35/28* | (2006.01) |
| *C22C 38/06* | (2006.01) |

(52) U.S. Cl.
CPC .......... *B23K 20/1275* (2013.01); *B23K 35/308* (2013.01); *C22C 38/28* (2013.01); *B23K 35/325* (2013.01); *B23K 35/327* (2013.01); *B23K 35/3053* (2013.01); *B23K 35/286* (2013.01); *C22C 38/002* (2013.01); *C22C 38/06* (2013.01); *B23K 35/3046* (2013.01); *B23K 35/3033* (2013.01)
USPC ......... 228/112.1; 228/2.1; 428/615; 428/637; 428/650

(58) Field of Classification Search
CPC ........................................ B23K 20/12–20/1225
USPC ................ 228/2.1, 112.1; 428/615, 636–638, 428/650–652
See application file for complete search history.

(56) References Cited

U.S. PATENT DOCUMENTS

| | | | |
|---|---|---|---|
| 5,611,479 A | 3/1997 | Rosen | |
| 6,129,997 A | 10/2000 | Braun et al. | |
| 6,536,651 B2 | 3/2003 | Ezumi et al. | |
| 6,543,671 B2 * | 4/2003 | Hatten et al. ............... | 228/112.1 |
| 7,032,800 B2 | 4/2006 | Subramanian et al. | |
| 7,048,175 B2 | 5/2006 | Runyan | |

(Continued)

FOREIGN PATENT DOCUMENTS

| | | |
|---|---|---|
| EP | 0797043 | 9/1997 |
| EP | 1057574 | 12/2000 |
| JP | 5212577 A | 8/1993 |
| JP | 6122076 A | 5/1994 |
| JP | 7256363 A | 10/1995 |
| JP | 11342481 | 12/1999 |
| JP | 200233284 | 8/2000 |

OTHER PUBLICATIONS

P. Miao, G.R. Odette, J. Gould, J. Bernath, R. Miller, M. Alinger, C. Zanis, "MA 957 nanostructured ferritic alloy joints", J. Nucl. Mater., 367-370 (2007), p. 1197-1202.*

(Continued)

*Primary Examiner* — Devang R Patel
(74) *Attorney, Agent, or Firm* — Scully, Scott, Murphy & Presser, P.C.

(57) ABSTRACT

A method of welding including forming a filler material of a first oxide dispersoid metal, the first oxide dispersoid material having first strengthening particles that compensate for decreases in weld strength of friction stir welded oxide dispersoid metals; positioning the filler material between a first metal structure and a second metal structure each being comprised of at least a second oxide dispersoid metal; and friction welding the filler material, the first metal structure and the second metal structure to provide a weld.

22 Claims, 3 Drawing Sheets

(56) References Cited

U.S. PATENT DOCUMENTS

| | | | |
|---|---|---|---|
| 7,337,940 | B2 | 3/2008 | Subramanian et al. |
| 7,762,447 | B2 * | 7/2010 | Feng et al. ............... 228/112.1 |
| 2003/0075584 | A1 * | 4/2003 | Sarik et al. .................. 228/2.1 |
| 2005/0139640 | A1 | 6/2005 | Kay |
| 2007/0119906 | A1 | 5/2007 | Mika |
| 2008/0078754 | A1 | 4/2008 | Hosemann et al. |
| 2008/0311420 | A1 * | 12/2008 | Zillmer et al. ............. 428/637 |
| 2009/0047170 | A1 | 2/2009 | Shoji et al. |
| 2009/0068491 | A1 | 3/2009 | Maruko et al. |

OTHER PUBLICATIONS

S.M. Howard, B.K. Jasthi, W.J. Arbegast, G.J. Grant, S. Koduri, D.R. Herling, "Friction Stir Welding of MA957 Oxide Dispersion Strengthened Ferritic Steel", Friction Stir Welding and Processing III, TMS, 2005.*

Cole et al., "Use of Friction Stir Welding and Friction Stir Processing for Advanced Nuclear Word Cloud", Information Bridge, DOE Scientific and Technical Information, Publication date Jun. 1, 2006, http://www.osti.gove/bridge/product.biblio.jsp?osti_id=011762.

Legendre, F., "Some microstructural characterisations in a friction stir welded oxide disperson strengthened ferritic steel alloy", Science Direct, Journal of Nuclear Materials, vols. 386-388, Apr. 30, 2009, pp. 537-539 http://www.sciencediret.com?_ob=ArticleURL&_udi=B6.

Tatlock et al. "Pulsed Plasma-Assisted Diffusion Bonding Oxide Dispersion-Strengthened-FeCrAl Alloys", Metallurgical and Materials Transaction A, Springer Boston, vol. 38, No. 7/Jul. 2007, published online Jun. 29, 2007.

Henderson, M.B. "Nickel based superalloy welding practices for industrial gas turbine applications", Science and Technology of Welding & Joining, vol. 9, No. 1, Feb. 2004, pp. 13-21 (9), Maney Publishing.

* cited by examiner

FRICTION STIR WELDING AND PROCESSING OF OXIDE DISPERSION STRENGTHENED (ODS) ALLOYS

This invention was made with government support under Contract Number DE-AC05-00OR22725 between the United States Department of Energy and UT-Battelle, LLC. The U.S. government has certain rights in this invention.

FIELD OF THE INVENTION

The present disclosure relates generally to oxide dispersion strengthened (ODS) alloys and methods of joining structures composed of oxide dispersion strengthened (ODS) alloys.

BACKGROUND OF THE INVENTION

Conventional high-temperature alloys are strengthened mainly by solid solution and precipitation mechanisms that hinder dislocation movement. As the desired service temperatures become increasingly higher and the service life becomes significantly longer, these alloys can eventually lose their strength as the precipitates become dissolved or coarsened, and the solid solute atoms become highly diffusive due to the greatly increased thermal agitation.

The oxide dispersion strengthened (ODS) alloys, on the other hand, derives its high temperature strength mainly from a fine dispersion of oxides that are nearly insoluble in the matrix. This insolubility enables the oxide particles to hinder dislocation movements and thus retain strength up to temperatures near the matrix melting point. Furthermore, unlike precipitation strengthening, which requires high solubility of solute atoms at high temperatures and vice versa, the ODS mechanism is free from this temperature solubility requirement.

However, the oxide dispersion strengthened (ODS) alloys have their own disadvantage in joining. The strengthening oxide particles can only be "mechanically alloyed" into the metallic matrix through powder metallurgy. Bulk melting in fusion welding of the oxide dispersion strengthened (ODS) metal inevitably destroys the fine particle distribution by causing particle aggregation as the strengthening oxide particles are rejected at the solidification front in the weld pool, thus resulting in substantial decrease in high temperature strength of the weld.

SUMMARY

The present disclosure, in one embodiment provides methods and structures for friction stir welding of oxide dispersion strengthened (ODS) metals, in which a filler material present between the structures to be joined controls the concentration, size, and distribution of the strengthening particles in the oxide dispersion strengthened (ODS) metal weld.

In one embodiment, the method of welding includes forming a filler material of a first oxide dispersoid metal, the first oxide dispersoid material having first strengthening particles that compensate for decreases in weld strength of the friction stir welded oxide dispersoid metals. The filler material may then be positioned between a first metal structure and a second metal structure. The first metal structure and the second metal structure may each be comprised of at least a second oxide dispersoid metal.

The filler material, the first metal structure and the second metal structure may then be friction stir welded to provide a weld joining the first metal structure to the second metal structure. The presence of the first strengthening particles increases the strength of the weld in comparison to similarly formed structures, in which the filler material is not employed.

In another embodiment, the welding method includes positioning a filler material comprised of a first oxide dispersoid metal between a first metal structure and a second metal structure, wherein the first metal structure and the second metal structure are composed of at least a second oxide dispersoid metal. The first oxide dispersoid metal may have a concentration of first strengthening particles that is greater than a concentration of second strengthening particles in the at least the second oxide dispersoid metal. The filler material, the first metal structure and the second metal structure may then be friction stir welded to provide a weld joining the first metal structure to the second metal structure.

In another aspect a weldment is provided that includes a first metal structure of a first oxide dispersoid material that is joined to a second metal structure of a second oxide dispersoid material by a weld, wherein the weld that is joining the first and second metal structures has a creep rupture stress that ranges from 75% to over 100% of a creep rupture stress of an unwelded portion of at least one of the first and second metal structures.

BRIEF DESCRIPTION OF THE DRAWINGS

The following detailed description, given by way of example and not intended to limit the invention solely thereto, will best be appreciated in conjunction with the accompanying drawings, wherein like reference numerals denote like elements and parts, in which.

DETAILED DESCRIPTION OF THE INVENTION

Figure 1A:
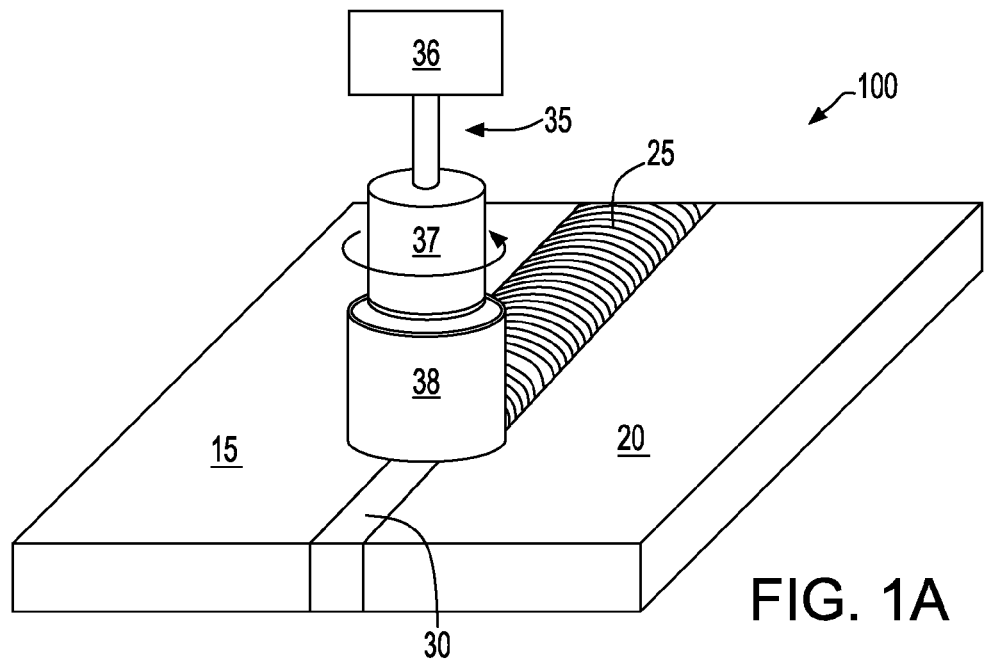
FIG. 1A is a perspective view depicting one embodiment of friction stir welding oxide dispersion strengthened (ODS) metals, in which a filler material controls the concentration, size, and distribution of the strengthening particles in the weld, in accordance with the present disclosure.

Detailed embodiments of the present disclosure are disclosed herein; however, it is to be understood that the disclosed embodiments are merely illustrative and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, such as a first structure, is present on a second element, such as a second structure, wherein intervening elements, such as an interface structure, e.g. interface layer, may be present between the first element and the second element. The term "direct contact" means that a first element, such as a first structure, and a second element, such as a second structure, are connected without any intermediary conducting, insulating or semiconductor layers at the interface of the two elements.

The embodiments of the present disclosure relate to novel methods for joining oxide dispersion strengthened (ODS) metals by friction stir welding. "Oxide dispersion strengthened (ODS) metals" are metals having a base material that provides a matrix as at least a first phase and at least a second phase of insoluble oxide containing particles, in which the second phase resists dislocation motion in the base material. By "insoluble" it is meant that the second phase (or phases) that resist dislocation motion does not dissolve into the first phase that provides the matrix of the oxide dispersion strengthened (ODS) metals in temperatures that are less than the melting temperature of the first phase, i.e., matrix. For example, in some embodiments, the melting temperature of second phase can about 2000° or greater, and the melting temperature of the first phase can be about 1500° C. or less. Some examples of materials that are suitable for the second phase include yttrium oxide (melting temperature of about 2425° C.), aluminum oxide (melting temperature of about 2072° C.), hafnium oxide (melting temperature of about 2758° C.), lanthanum oxide (melting temperature of about 2315° C.), and cerium oxide (melting temperature of about 2400° C.).

Typically, the obstruction of plastic dislocation motion increases the material's strength. "Friction welding" is a solid state joining process, in which frictional heating at the interface of two structures produces a metallic bond that joins the two structures without melting the two structures. Friction welding may soften the structures to be joined during the joining process, but typically does not increase the temperature of the two structures to be joined to greater than their melting temperature. One form of friction welding is friction stir welding. In friction stir welding the frictional heating that produces the metallic bond between the structures to be joined is provided by a rotational tool.

It has been determined that friction stir welding of oxide dispersion strengthened (ODS) materials, despite being a solid joining process, can still reduce the strength enhancing performance of the material by damaging the strengthening particles in the weld. By damaging the strengthening particles in the weld, the mechanism by which oxide dispersion strengthened (ODS) metals are strengthened is diminished, which results in a weld having a strength that is less than the oxide dispersion strengthened (ODS) metals that are joined. During friction stir welding, the strengthening particles may migrate away from the weld, may evaporate, or may combine with other elements to provide compounds that can dissolve into the matrix.

Methods and structures are disclosed herein that overcome the damage to the strengthening particles of oxide dispersion strengthened (ODS) metals that have been joined by friction stir welding. The methods and structures disclosed herein employ a filler material that introduces compensatory strengthening particles to the interface of the oxide dispersion strengthened (ODS) metal structures that are being joined by friction stir welding. In one embodiment, the compensatory strengthening particles are of a composition, size, size distribution, fractional volume, and microstructural location distribution that counterbalance the loss and degradation of strengthening particles in the joint/weld zone that is produced by friction stir welding of oxide dispersion strengthened (ODS) metals.

FIGS. 1A-1G depict one embodiment of a method of welding that includes forming a filler material 10 of a first oxide dispersoid metal, the first oxide dispersoid material having first strengthening particles that compensate for decreases in weld strength of friction stir welded oxide dispersoid metals. The filler material 10 may be positioned between a first metal structure 15 and a second metal structure 20. The first metal structure 15 and the second metal structure 20 may each be comprised of at least a second oxide dispersoid metal. The filler material 10, the first metal structure 15 and the second metal structure 20 may then be friction stir welded to provide a weld 25 joining the first metal structure 15 to the second metal structure 20. The presence of the first strengthening particles increases the strength of the weld 25 in comparison to similar structures, in which the filler material 10 is not employed. The term oxide dispersoid metal as used herein is interchangeable with the term oxide dispersion strengthened (ODS) metal.

The first metal structure 15 and the second metal structure 20 may each be composed of an oxide dispersion strengthened (ODS) metal. The first metal structure 15 may be composed of an oxide dispersion strengthened (ODS) metal having the same or a different composition as the second metal structure 20. The oxide dispersion strengthened (ODS) metal that provides the first metal structure 15 and the second metal structure 20 may include at least one of a nickel (Ni)-based material, a chromium (Cr)-based material, an aluminum (Al)-based material, an iron (Fe)-based material, a titanium (Ti)-based material, a cobalt (Co)-based material or a combination thereof. In one embodiment, the oxide dispersion strengthened (ODS) metal is nickel (Ni)-based having a nickel content that is greater than about 50%, or the oxide dispersion strengthened (ODS) metal is iron (Fe)-based having an iron (Fe) content that is greater than 50%. Chromium (Cr), aluminum (Al), and titanium (Ti) may be present in the nickel (Ni)-based or iron (Fe)-based oxide dispersion strengthened (ODS) metal in concentrations of less than 50%. By base material it is meant that the material provides the first phase, or matrix, of the oxide dispersion strengthened (ODS) metal. In one example, the base material of an oxide dispersion strengthened (ODS) metal is $Fe_3Al$ alloy.

The oxide dispersion strengthened (ODS) metal of the first metal structure 15 and the second metal structure 20 also include strengthening particles. The concentration of the strengthening particles that is present in the oxide dispersion strengthened (ODS) metal that is employed in the first and second metal structure 15, 20 has a typical fractional volume of about 0.3% to about 5%. In another embodiment, the concentration of the strengthening particles that is present in the oxide dispersion strengthened (ODS) metal that is employed in the first and second metal structure 15, 20 ranges from a fractional volume of about 0.1% to about 2%. In yet another embodiment, the concentration of the strengthening particles that is present in the oxide dispersion strengthened (ODS) metal that is employed in the first and second metal structure ranges from a fractional volume of about 0.5% to about 1%. In yet another embodiment, the concentration of the strengthening particles that is present in the oxide dispersion strengthened (ODS) metal that is employed in the first and second metal structure 15, 20 has a typical fractional volume of about 0.3% to about 0.5%. It is noted that the above concentrations for the strengthening particles in the oxide dispersion strengthened (ODS) metal for the first and second metal structures 15, 20 are provided for illustrative purposes, and are not intended to limit the invention. It is noted that other concentrations of strengthening particles have also been contemplated, and are within the scope of the present disclosure, so long as the concentration of strengthening particles contributes to obstructing dislocation movement in the oxide dispersion strengthened (ODS) metal.

The peak concentration of the strengthening particles may have a diameter ranging from about 2 nm to about 1 micron. In one example, the peak concentration of the strengthening particles in the oxide dispersion strengthened (ODS) metal has a diameter ranging from about 2 nm to about 5 nm. In another example, the peak concentration of the strengthening particles in the oxide dispersion strengthened (ODS) metal has a diameter ranging from about 10 nm to about 30 nm. In yet another example, the peak concentration of the strengthening particles in the oxide dispersion strengthened metal (ODS) has a diameter ranging from about 20 nm to about 40 nm. In a further example, the peak concentration of the strengthening particles in the oxide dispersion strengthened (ODS) has a diameter ranging from about 50 nm to about 70 nm. In yet an even further example, the peak concentration of the strengthening particles in the oxide dispersion strengthened (ODS) metal has a diameter ranging from about 0.5 micron to 1 about mircon.

In some embodiments, the strengthening particles, e.g., oxides, may be composed of a yttrium (Y)-containing material, aluminum (Al)-containing material, hafnium (Hf)-containing materials, lanthanum (La)-containing material, titanium (Ti)-containing materials, or cerium (Ce)-containing material. Some examples compositions that are suitable for the strengthening particle of the oxide dispersion strengthened (ODS) metal include yttrium (III) oxide ($Y_2O_3$), aluminum (III) oxide ($Al_2O_3$), hafnium (IV) oxide ($HfO_2$), lanthanum (III) oxide ($La_2O_3$), titanium oxide ($Ti_2O_3$), cerium (IV) oxide ($CeO_2$), cerium (III) oxide ($Ce_2O_3$) or combinations thereof. The strengthening particles are at least one component of the second phase of the oxide dispersion strengthened (ODS) metal.

It is noted that the above compositions for the strengthening particles are provided for illustrative purposes and are not intended to limit the present disclosure. Other compositions have been contemplated for the strengthening particles, and are within the scope of the present disclosure, so long as the composition selected for the strengthening particles is insoluble in the matrix, i.e., first phase, of the oxide dispersion strengthened (ODS) metal.

In one example, the first metal structure 10 and the second metal structure 15 are both composed of an oxide dispersion strengthened alloy composed of about 18.5 wt % to about 21.5 wt % chromium (Cr), about 3.75 wt % to about 5.75 wt % (Al), about 0.2 wt % to about 0.6 wt % titanium (Ti), about 0.3 wt % to about 0.7 wt % yttrium oxide ($Y_2O_3$), up to about 0.1 wt % carbon (C), up to about 0.15 wt % copper (Cu), up to about 0.30 wt % manganese (Mn), up to about 0.30 wt % cobalt (Co), up to about 0.5 wt % nickel (Ni), up to about 0.02 wt % phosphorus (P), and a balance of iron (Fe) and incidental impurities. The term "incidental impurities" refers to elements that are not purposeful additions to the alloy, but that due to impurities and/or leaching from contact with manufacturing equipment, trace quantities of such elements being no greater than about 0.05 wt % each and in combination no greater than about 0.15 wt % of the final alloy, which may nevertheless find their way into the final alloy product.

In another example, the first metal structure 10 and the second metal structure 15 are both composed of an oxide dispersion strengthened alloy composed of about 78 wt % nickel (Ni), about 20 wt % chromium (Cr), about 1 wt % iron (Fe), about 0.05 wt % carbon (C), about 0.3 wt % aluminum (Al), about 0.5 wt % titanium (Ti), about 0.6 wt % yttrium oxide and incidental impurities.

In a further example, the first metal structure 10 and the second metal structure 15 are both composed of an oxide dispersion strengthened alloy composed of about 13 wt % chromium (Cr), about 1.5 wt % molybdenum (Mo), about 2.9 wt % titanium (Ti), about 1.8 wt % titanium oxide ($Ti_2O_3$), and a balance of iron (Fe) and incidental impurities.

Yet in another example, the first metal structure 10 is composed of an oxide dispersion strengthened alloy composed of about 0.06 wt % carbon (C), about 19.5 wt % chromium (Cr), about 6 wt % aluminum (Al), about 3.4 wt % tungsten (W), about 1.2 wt % iron (Fe), about 0.3 wt % nitrogen (N), about 0.6 wt % oxygen (O), about 1 wt % yttrium oxide ($Y_2O_3$), and a balance of nickel (Ni) and incidental impurities; and the second metal structure 15 is composed of about 0.05 wt % carbon (C), about 30 wt % chromium (Cr), about 0.3 wt % aluminum (Al), about 0.5 wt % tungsten (W), about 0.37 wt % oxygen (O), about 0.6 wt % yttrium oxide ($Y_2O_3$), and a balance of nickel (Ni) and incidental impurities. Other compositions have been contemplated for the first and second metal structures 15, 20 and are within the scope of the present disclosure.

Although the first metal structure 15 and the second metal structure 20 are depicted as having a plate geometry in FIGS. 1A-1G, the first metal structure 15 and the second metal structure 20 may have any geometry or surface curvature, so long as the surfaces at which the weld 25 is formed provides sufficient clearance for access by the friction stir welding tool. The thickness of the first metal structure 15 and the second metal structure 20 may range from 5 mm to 10 mm. In another embodiment, the first metal structure 15 and the second metal structure 20 may have a thickness ranging from 20 mm to 25 mm. Other thickness have been contemplated for the first metal structure 15 and the second metal structure 20, and are within the scope of the present disclosure.

In the joining process, a filler material 10 of an oxide dispersoid strengthened (ODS) metal may be positioned between the first metal structure 15 and the second metal structure 20. The oxide dispersion strengthened (ODS) material of the filler material 10 includes strengthening particles to compensate for the decreases in weld strength that occurs in friction stir welded oxide dispersion strengthened (ODS) metals that are joined without employing the filler material 10 disclosed herein. The oxide dispersion strengthened (ODS)

metal that provides the filler material 10 may be composed of a base material, i.e., first phase (which is also referred to the matrix of the oxide dispersion strengthened (ODS) metal), that is the same as the base material of the oxide dispersion strengthened (ODS) metal of the first and second metal structure 15, 20. In another embodiment, the oxide dispersion strengthened (ODS) metal that provides the filler material 10 may be composed of a base material, i.e., first phase, that is different from the base material of the oxide dispersion strengthened (ODS) metal of the first and second metal structures 15, 20. The oxide dispersion strengthened (ODS) metal that provides the filler material 10 may include at least one of a nickel (Ni)-based material, a chromium (Cr)-based material, an aluminum (Al)-based material, an iron (Fe)-based material, a titanium (Ti)-based material, cobalt (Co)-based material or a combination thereof. In one embodiment, the oxide dispersion strengthened metal that provides the filler material 10 is a nickel (Ni)-based having a nickel content that is greater than about 50 wt. %, or the oxide dispersion strengthened metal that provides the filler material is iron (Fe)-based having an iron (Fe) content that is greater than 50 wt %. Chromium (Cr), aluminum (Al), and titanium (Ti) may be present in the nickel (Ni)-based or iron (Fe)-based oxide dispersion strengthened (ODS) metal in concentrations of less than 50 wt %. By "base material" it is meant that the material that provides the first phase, or matrix, of the oxide dispersion strengthened (ODS) metal.

The strengthening particles and the oxide dispersion strengthened (ODS) metal that provide the filler material 10 are of a compensatory metal and particle composition, size, size distribution, fractional volume and microstructural location distribution that counterbalance the loss and degradation of the metal composition and strengthening particle conditions in the joint/weld zone that results from the friction stir welding. Compensatory metal and particle composition means that the composition of the matrix and the strengthening particles in the filler material 10 compensate for the loss in, or damage to, the oxide dispersion strengthened (ODS) metal of the first and second metal structure 15, 20 due to the welding process, i.e., friction stir welding. For example, if one particular element, e.g., strengthening particle, of the oxide dispersion strengthened metal of the first and second metal structures 15, 20 evaporates or combines with other elements during the welding process and is no longer available to function as an obstruction to dislocation movement or other strengthening means, the composition of the filler material 10, i.e., strengthening particles of the filler material 10, can compensate for that loss.

Compensatory size and size distribution means that the strengthening particle size and the strengthening particle size distribution in the filler material 10 compensates for loss in, or damage to, the strengthening particle size and strengthening particle size distribution in the first and second metal structures 15, 20 that results from the welding process, e.g., friction stir welding. For example, if the strengthening particles of the first and second metal structures 15, 20 become smaller or dissolve in the weld due to chemical reactions during the welding process, e.g., friction stir welding process, the size and size distribution of the strengthening particles in the filler material 10 may be selected to compensate for that loss.

The concentration of the strengthening particles in the oxide dispersion strengthening (ODS) metal of the filler material 10 may be equal to or greater than the concentration of strengthening particles of the first and second metal structures 15, 20. For example, in one embodiment, the concentration of the strengthening particles in the oxide dispersion strengthening (ODS) metal of the filler material 10 may be 2% to 35% greater than the concentration of strengthening particles of the first and second metal structures 15, 20. In another embodiment, the concentration of the strengthening particles in the oxide dispersion strengthening (ODS) metal of the filler material 10 may be 5% to 25% greater than the concentration of strengthening particles of the first and second metal structures 15, 20. In yet another embodiment, the concentration of the strengthening particles in the oxide dispersion strengthening (ODS) metal of the filler material 10 may be 10% to 15% greater than the concentration of strengthening particles of the first and second metal structures 15, 20.

The concentration of the strengthening particles that is present in the oxide dispersion strengthened (ODS) metal that is employed in the filler material 10 is typically less than about 2 vol. %. In another embodiment, the concentration of the strengthening particles that is present in the oxide dispersion strengthened (ODS) metal that is employed in the filler material 10 ranges from about 0.1 vol. % to about 0.8 vol. %. In yet another embodiment, the concentration of the strengthening particles that is present in the oxide dispersion strengthened (ODS) metal that is employed in the filler material 10 ranges from about 0.3 vol. % to about 0.7 vol. %. It is noted that the above concentrations for the strengthening particles in the oxide dispersion strengthened (ODS) metal for the filler material 10 are provided for illustrative purposes, and are not intended to limit the invention. It is noted that other concentrations of strengthening particles have also been contemplated, and are within the scope of the present disclosure, so long as the concentration of strengthening particles in the filler material 10 compensates for the decreased amount of strengthening particles from the first and second metal structures 15, in the weld. The decreased amount of strengthening particles from the first and second metal structures 15, 20 in the weld is measured in comparison to the concentration of strengthening particles in the portions of the first and second metal structures 15, 20 that are not impacted by the welding process, e.g., friction stir welding.

The peak concentration of the strengthening particles in the filler material 10 may have a diameter ranging from about 2 nm to about 1 micron. In one example, the peak concentration of the strengthening particles in the oxide dispersion strengthened (ODS) metal of the filler material 10 has a diameter ranging from 2 nm to 5 nm. In another example, the peak concentration of the strengthening particles in the oxide dispersion strengthened (ODS) metal of the filler material 10 has a diameter ranging from about 10 nm to about 30 nm. In yet another example, the peak concentration of the strengthening particles in the oxide dispersion strengthened (ODS) metal of the filler material 10 has a diameter ranging from about 20 nm to about 40 nm. In a further example, the peak concentration of the strengthening particles in the oxide dispersion strengthened (ODS) metal of the filler material 10 has a diameter ranging from about 50 nm to about 70 nm. In yet an even further example, the peak concentration of the strengthening particles in the oxide dispersion strengthened (ODS) metal of the filler material 10 has a diameter ranging from 0.5 microns to 1 mircon.

In some embodiments, the strengthening particles, e.g., oxides, of the filler material 10 may be composed of a yttrium (Y)-containing material, aluminum (Al)-containing material, hafnium (Hf)-containing materials, lanthanum (La)-containing material, titanium (Ti)-containing materials, or cerium (Ce)-containing material. Some examples compositions that are suitable for the strengthening particle of the oxide dispersion strengthened (ODS) metal of the filler material 10 include yttrium (III) oxide ($Y_2O_3$), aluminum (III) oxide ($Al_2O_3$), hafnium (IV) oxide ($HfO_2$), lanthanum(III) oxide ($La_2O_3$), titanium oxide ($Ti_2O_3$), cerium (IV) oxide ($CeO_2$), and cerium(III) oxide ($Ce_2O_3$). The strengthening particles are at least one component of the second phase of the oxide dispersion strengthened (ODS) metal.

It is noted that the above compositions for the strengthening particles for the filler material 10 are provided for illustrative purposes and are not intended to limit the present disclosure. Other compositions have been contemplated for the strengthening particles, and are within the scope of the present disclosure, so long as the composition selected for the strengthening particles is insoluble in the matrix, i.e., first phase, of the oxide dispersion strengthened (ODS) metal.

In one example, the filler material 10 is an oxide dispersion strengthened alloy composed of about 18.5 wt % to about 21.5 wt % chromium (Cr), about 3.75 wt % to about 5.75 wt % (Al), about 0.2 wt % to about 0.6 wt % titanium (Ti), about 0.7 wt % to about 1.2 wt % yttrium oxide ($Y_2O_3$), up to about 0.1 wt % carbon (C), up to about 0.15 wt % copper (Cu), up to about 0.30 wt % manganese (Mn), up to about 0.30 wt % cobalt (Co), up to about 0.5 wt % nickel (Ni), up to about 0.02 wt % phosphorus (P), and a balance of iron (Fe) and incidental impurities.

In another example, the filler material 10 is an oxide dispersion strengthened alloy composed of about 78 wt % nickel (Ni), about 20 wt % chromium (Cr), about 1 wt % iron (Fe), about 0.05 wt % carbon (C), about 0.3 wt % aluminum (Al), about 0.5 wt % titanium (Ti), about 0.6 wt % to about 1.4 wt % yttrium oxide and incidental impurities.

Yet in another example, the first metal structure 10 and the second metal structure 15 are both composed of an oxide dispersion strengthened alloy composed of about 13 wt % chromium (Cr), about 1.5 wt % molybdenum (Mo), about 2.9 wt % titanium (Ti), about 1.8 wt % to about 2.5 wt % titanium oxide ($Ti_2O_3$), and a balance of iron (Fe) and incidental impurities.

The filler material 10 is typically composed of oxide dispersion strengthened (ODS) metal that is produced by mechanical alloying. After the filler material 10, the first metal structure 15 and the second metal structure 20 are formed they are then positioned adjacent to each other to form an intersection at a desired welding location. In some embodiments, the filler material 10, the first metal structure 15 and the second metal structure 20 are braced together to prevent from moving apart during the welding operation, e.g., during the friction stir welding operation. In some embodiments, the filler material 10, the first metal structure 15 and the second metal structure 20 may be positioned on a backer plate during the welding operation. In one embodiment, the backer plate is composed of stainless steel.

In the embodiment that is depicted in FIG. 1A, the filler material 10 has a geometry with a height that is substantially equal to or slightly higher than the height of the first and second metal structures 15, 20. In this embodiment, in which the first metal structure 15, second metal structure 20, and filler material 10 are of a sheet or plate geometry, the upper surface of the filler material 10 is coplanar with or slightly higher than the upper surface of the first metal structure 15 and the upper surface of the second metal structure 20, and the lower surface of the filler material 10 is coplanar with or slightly lower than the lower surface of the first metal structure 15 and the lower surface of the second metal structure 20. In this embodiment, prior to welding, the filler material 10 is positioned so that a first sidewall of the filler material 10 is in direct contact with the entire height of the sidewall of the first metal structure 15, and a second sidewall of the filler material 10 is in direct contact with the entire height of the sidewall of the second metal structure 20.

Referring to FIGS. 1B-1E, in one embodiment, a stepped interface 50 is formed between the first and second metal structures 15, 20, and a filler material 10a, 10b, 10c, 10d, 10e, 10f, 10g, 10h, 10i is positioned at the interface. The stepped interface 50 provides for multiple passes of the friction stir welding tool 37. In this embodiment, the first and second metal structures 15, 20 may be machined so that each of the first and second metal structures 15, 20 has a sidewall with a ledge having dimensions suitable for at least one portion of the filler material 10a, 10b, 10c, 10d, 10e, 10f, 10g, 10h, 10i. It is noted that the above number of steps and number of filler material 10a-10i are provided for illustrative purposes, and are not intended to limit the invention. The numbers can be as many as needed to fill up the thickness of the first and second metal structures 15 and 20 and the widths of the steps to form the joint.

In one example, the stepped interface 50 may include three levels 51, 52, 53, in which the separation of the sidewall of the first and second metal structures 15, 20 at the interface increases with increasing levels from the base surface of the first and second metal structures 15, 20. For example, the width separating the first metal structure 15 from the second metal structure 20 at the first level 51 of the stepped interface 50 is less than the width separating the first metal structure 15 from the second metal structure 20 at the second level 52 of the interface 50. The width separating the first metal structure 15 from the second metal structure 20 at the second level 51 of the stepped interface 50 is less than the width separating the first metal structure 15 and the second metal structure 20 at the third level 53 of the stepped interface 50.

Figure 1B:
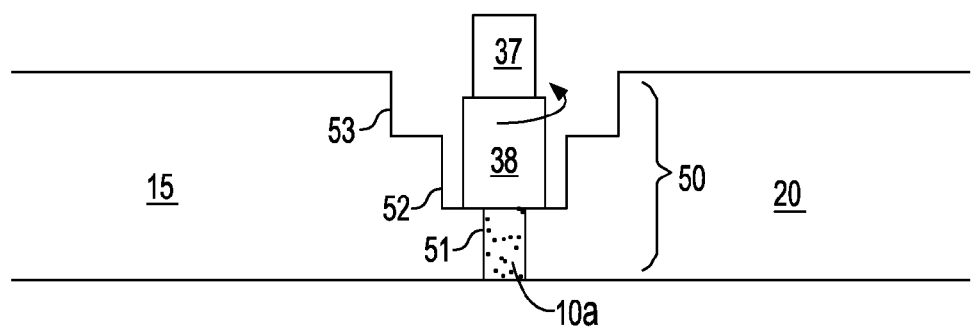
FIGS. 1B-1E are side cross-sectional views depicting another embodiment of friction stir welding oxide dispersion strengthened (ODS) metals, in which a filler material positioned at a stepped interface of the two oxide dispersion strengthened (ODS) metals controls the concentration, size, and distribution of the strengthening particles in the weld, in accordance with the present disclosure.
Figure 1C:
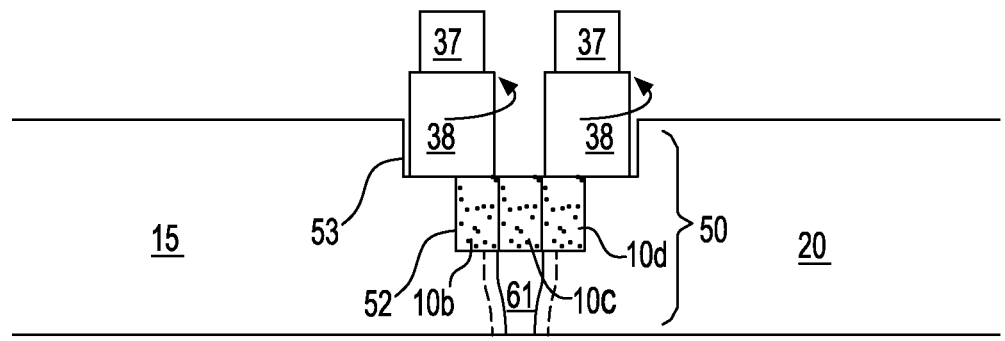

In one embodiment, a first portion of filler material 10a may be present between the first level 51 of the stepped interface 50, as depicted in FIG. 1B. In some embodiments, the separation of the first metal structure 15 and the second metal structure 20 is selected to allow the friction stir welding tool to be traversed along the first level 51 of the interface 50 in direct contact with the filler material 10a, the first metal structure 10 and the second metal structure 15. Once the friction stir welding tool 37 has been traversed along the first level 51 of the interface 50, a first welded portion 61 is provided joining the first metal structure 15 and the second metal structure 20 in the first level 51 of the interface 50, as depicted in FIG. 1C.

Referring to FIG. 1 C, a plurality of filler materials 10b, 10c, 10d may then be positioned in the second level 52 of the interface 50. In one example, the plurality of filler materials 10b, 10c, 10d, include three separate portions. The width of each portion of filler material 10b, 10c, 10d is selected to provide for an overlap in the coverage between the filler material 10b, 10c and the first and second metal structure 15, 20, or between adjacent filler materials 10b, 10c, 10d, by the friction stir welding tool 37 during the welding process. By providing overlap between adjacent portions of the filler material 10b, 10c, 10d, and by providing overlap between the portions of the filler material 10b, 10d and the first and second metal structure 15, 20, the entire interface 50 at the second level 52 is welded. The portions of the filler material 10b, 10c, 10d are of a thin width such that the friction stir welding tool 37 creates overlapped welding passes to eliminate any unwelded gap in the final product. Once the friction stir welding tool 37 has been traversed along each interface of the filler material 10b, 10c, 10d within the second level 52 of the interface 50, a second welded portion 62 is provided joining the first metal structure 15 and the second metal structure 20 in the second level 52 of the interface 50, as depicted in FIG. 1D.

Figure 1D:
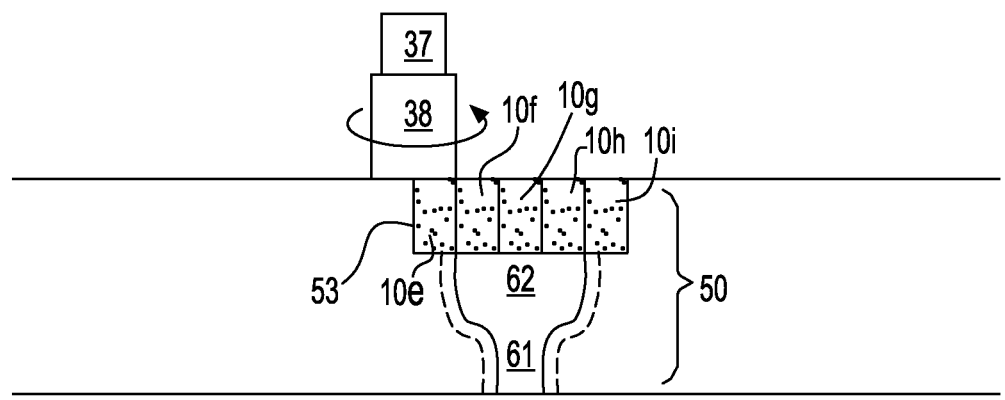
Figure 1E:
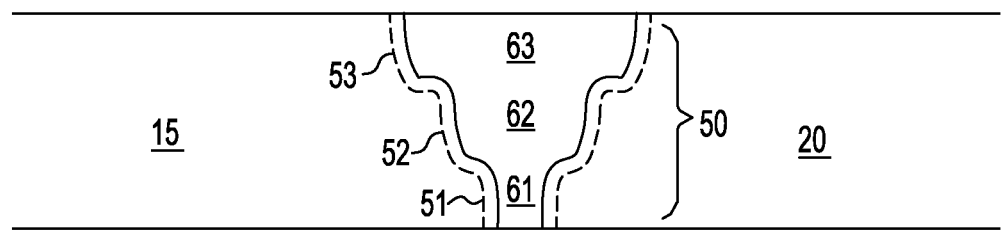

FIG. 1D illustrates welding the third level 53 of the interface 50. In one example, before friction stir welding the third level 53 of the interface 50, at least five portions of filler material 10e, 10f, 10g, 10h, 10i are positioned atop the second welded portion 62 within the third level 53 of the interface 50 that is joining the first and second metal structure 15, 20. The width of each portion of filler material 10e, 10f, 10g, 10h, 10i is selected to provide for an overlap in the coverage between the filler material 10e, 10i and the first and second metal structure 15, 20, or between the adjacent portions of filler material 10e, 10f, 10g, 10h, 10i, by the friction stir welding tool 37 during the welding process. By providing overlap between adjacent portions of the filler material 10e, 10f, 10g, 10h, 10i, and by providing overlap between the portions of the filler material 10e, 10i that are adjacent to the first and second metal structure 10, 15, the entire interface 50 at the third level 53 is welded. The portions of the filler material 10e, 10f, 10g, 10h, 10i are of a thin width such that the friction stir welding tool 37 creates overlapped welding passes to eliminate any unwelded gap in the final product. Once the friction stir welding tool 37 has been traversed along the third level 53 of the interface 50, a third welded portion 63 is provided joining the first metal structure 10 and the second metal structure 15 in the third level 53 of the interface 50, as illustrated in FIG. 1E.

Figure 1F:
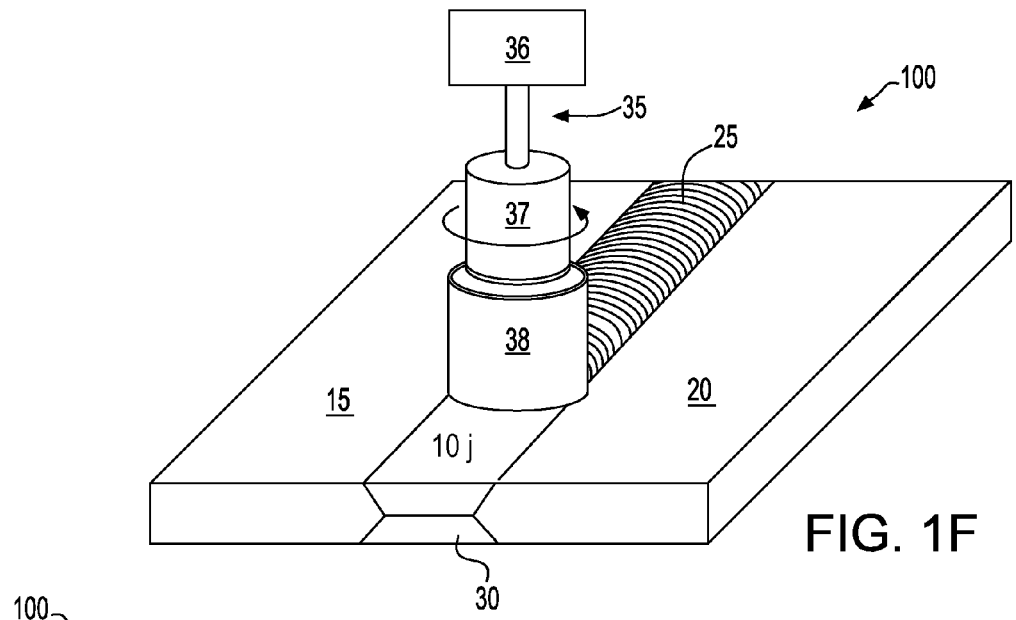
FIG. 1F is a perspective view depicting one embodiment of friction stir welding oxide dispersion strengthened (ODS) metals, in which a filler material having a tapered sidewall controls the concentration, size, and distribution of the strengthening particles in the weld, in accordance with the present disclosure.
Figure 1G:
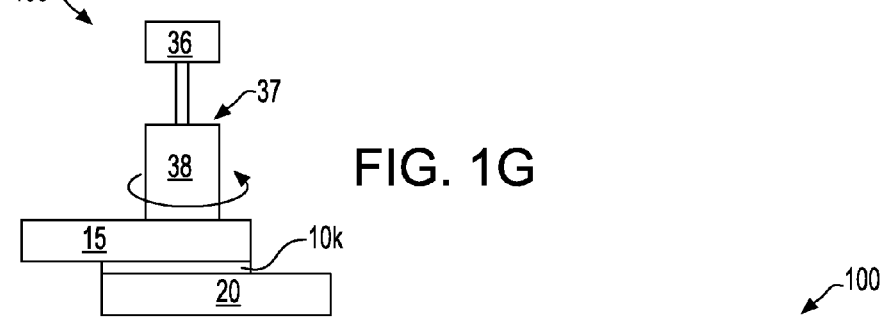
FIG. 1G is a side cross-sectional view depicting one embodiment of friction stir welding of a lap weld.

FIG. 1F depicts another embodiment, in which the filler material 10j is formed having a tapered sidewall, or is machined to provide a tapered sidewall. In this embodiment, the sidewall of the first and second metal structures 15, 20 may be machined to correspond to the taper of the filler material 10j. After completion of the weld on one side, the assembly is flipped over for the rotational tool to complete the weld on the reverse side to form the final weldment. FIGS. 1A-1F depict some embodiments of the present disclosure that provide a butt weld using friction stir welding. It is noted that the present disclosure is not to be limited to only butt welding, as other forms of welds can also be provided by the present method. For example, the friction stir welding process disclosed herein including the filler material 10k may also provide lap welds of oxide dispersion strengthened (ODS) metals, as depicted in FIG. 1G.

FIGS. 1A-1G depict a welded structure being formed with friction stir welding (FSW) system. As shown, welded structure is provided that includes the first metal structure 15, second metal structure 20 and the filler material 10, 10a, 10b, 10c, 10d, 10e, 10f, 10h, 10i, 10j, 10k that abut each other at an intersection. The first metal structure 15, the second metal structure 20, and the filler material 10, 10a, 10b, 10c, 10d, 10e, 10f, 10h, 10i, 10j, 10k are welded together at the intersection with a friction stir welding system 35 to form welded joint 25 (also referred to as weld), where welded joint 25 substantially retains the pre-weld strengths of the first metal structure 15 and the second metal structure 20. For example, in one embodiment, the welded joint 25 may have a high temperature creep-rupture stress that is within 75% to greater 100% of the creep-rupture stress of the first and second metal structures 15, 20, wherein the first and second metal structures 15, 20 have the same composition and the creep-rupture stress is measured in compliance with ASTM E139, i.e. "Standard Test Method for Conducting Creep, Creep-Rupture, and Stress-Rupture Tests of Metallic Materials". In another embodiment, the welded joint 25 may have a high temperature creep-rupture stress that is within 75% to 100% of the creep-rupture stress of the first and second metal structures 15, 20, wherein the first and second metal structures 15, 20 have the same composition and the creep-rupture stress is measured in compliance with ASTM E139, i.e. "Standard Test Method for Conducting Creep, Creep-Rupture, and Stress-Rupture Tests of Metallic Materials". In another embodiment, the welded joint 25 may have a high temperature creep-rupture stress that is within 75% to 98% of the creep-rupture stress of the first and second metal structures 15, 20, wherein the first and second metal structures 15, 20 have the same composition and the creep-rupture stress is measured in compliance with ASTM E139, i.e. "Standard Test Method for Conducting Creep, Creep-Rupture, and Stress-Rupture Tests of Metallic Materials". In another example, the welded joint 25 that is joining the first and second metal structures 15, 20 has a creep rupture stress that is within 80% to 90% of a creep rupture stress of an unwelded portion of at least one of the first and second metal structures 15, 20.

In another embodiment, the welded joint 25 may have a high temperature mass change in oxidizing environments that is within 95% of the mass change of the first and second metal structures 15, 20 in similar oxidizing environments, wherein the first and second metal structures 15, 20 have the same composition. In yet another embodiment, the welded joint 25 may have a high temperature creep-rupture time that is within 85% to 95% of the high temperature creep-rupture time of the first and second metal structures 15, 20, wherein the first and second metal structures 15, 20 have the same composition. High temperatures are considered to be greater than 300° C., and in some instances greater than 750° C. For example, in nickel-based oxide dispersion strengthened (ODS) metals high temperatures for the purposes of measuring high temperature creep-rupture time and high temperature mass change range from 850° C. to 1000° C., or greater than 1000° C.

It is noted that the above methods of measurement and ranges for the high temperature strength and corrosion resistance of the welded joint 25 are provided for illustrative purposes, and are not intended to limit the invention. Other measurements and ranges have also been contemplated, and are within the scope of the present disclosure.

The friction stir welding system 35 includes controller 36 and a tool 37 that is composed of a shoulder 38 and a pin (not shown). In one embodiment, the tool 37 may be pinless, in which the tool only contacts the upper surface of the first metal structure 15 or the second metal structure 20, when the first metal structure 15 or the second metal structure 20 as shown in FIG. 1G is in the form of thin sheet.

In another embodiment, the tool 37 includes a pin. The pin extends from the bottom surface of the shoulder 38 of the tool 37 and is pressed into the filler material 10, 10a, 10b, 10c, 10d, 10e, 10f, 10h, 10i, 10j, 10k during a friction stir welding operation. The pin may or may not contact the first metal structure 15 and the second metal structure 20 during the operation. The depth of pin may determine the depth of the welded joint 25 at the intersection.

The tool 37 is typically composed of a material that withstands the forces generated by the friction stir welding process in high strength alloys. In one embodiment, the tool 37 is composed of cubic boron nitride (CBN). Polycrystalline boron nitride (PCBN), silicon nitride based alloys, tungsten rhenium alloys, and titanium carbide metal matrix composites are other candidates for the tool 37. It is noted that the above tool materials are provided for illustrative purposes, and are not intended to limit the invention.

The controller 36 directs the shoulder 38 of the tool 37 and the optional pin to rotate, and to press down into the filler material 10, 10a, 10b, 10c, 10d, 10e, 10f, 10h, 10i, 10j, 10k, the first metal structure 15 and the second metal structure 20. While tool 37 is rotating, the controller 36 directs the tool 37 to move along intersection. As the tool 37 moves along the intersection, the rotation of tool 37 and the optional pin frictionally heat the filler material 10, the first metal structure 15 and the second metal structure 20 proximate to the intersection.

The heated alloys enter a plastic-like state, and are stirred by the rotational motion of tool 37 and the optional pin, thereby creating welded joint 25 at intersection. During the stirring, the tool pin may or may not come into frictional contact with the first metal structure 15 and the second metal structure 20. The friction stir welding operation is a solid-state welding process, in which the heated alloys do not melt. As such, the refined microstructures of the oxide dispersion strengthened (ODS) metals of the filler material 10, 10a, 10b, 10c, 10d, 10e, 10f, 10h, 10i, 10j, 10k, the first metal structure 15 and the second metal structure 20 are substantially retained while forming the welded joint 25. This is in contrast to other welding techniques, such as fusion welding, in which the welded alloys are melted to form the welded joint. Melting oxide dispersion strengthened (ODS) metals destroys the refined microstructure of the metal, thereby lowering the high temperature strength and creep rupture resistance of the resulting welded structure.

The operation parameters of friction stir welding system 35 may vary depending on the geometries and materials of the tool 37 and the optional pin, and on the geometries of the first and second metal structures 15, 20. In one embodiment, suitable rotational rates for the tool 37 and optional pin range from about 200 rotations-per-minute (rpm) to about 2,000 rpm. In another embodiment, suitable rotational rates for the tool 37 and optional pin range from about 1,000 rpm to about 1,200 rpm. Suitable vertical loads applied to tool 37 and the optional pin range from about 453 kilograms (i.e., about 1,000 pounds) to about 6795 kilograms (i.e., about 15,000 pounds). Suitable forward movement rates along the intersection range from about 2.5 centimeters/minute (i.e., about 1 inch/minute) to about 20 centimeters/minute (i.e., about 8 inches/minute).

If more than two metal parts are to be welded together, the friction stir welding process may be repeated for each intersection between the metal parts. When the friction stir weld operation is completed, the top surfaces of welded structure can be finished, if desired, (e.g., ground and polished) at welded joint 25 to provide a smooth aesthetic surface.

Figure 2:
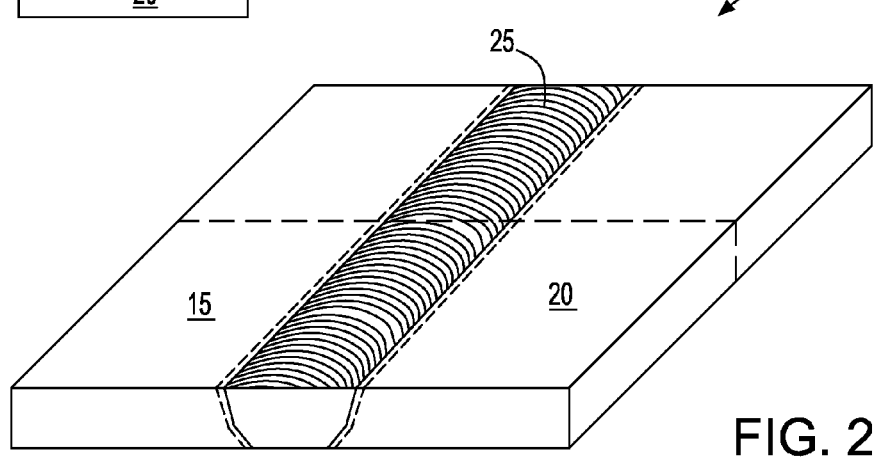
FIG. 2 is a perspective view of a weld formed by friction stir welding two oxide dispersion strengthened (ODS) metals with a filler material positioned therebetween, in accordance with one embodiment of the present disclosure.

FIG. 2 shows an example of the completed weld joint 25 after the tool 37 has traversed the total length of intersection, and welded joint 25 covers the total length of welded structure.

The welded joint 25 is typically a uniformly mixed region of the filler material, the first metal structure 15 and the second metal structure 20. The introduction of the filler material 10 typically recovers the strengthening particles in the welded joint 25 in comparison to welded structure formed by friction stir welding without utilizing the filler material of the present disclosure. By recovering the strengthening particles in the welded joint 25, the fractional volume/concentration, composition, size, size distribution, and microstructural location distribution of the strengthening particles in the welded joint 25 is more consistent with the fractional volume/concentration, composition, size, size distribution, and microstructural location distribution of the strengthening particles that is present in the first metal structure 15 and the second metal structure 20. For example, in one embodiment, the concentration of strengthening particles in the welded joint 25 may range from at least 15% less than the concentration of strengthening particles in at least one of the first and second metal structure 15, 20 to as great as 15% more than the concentration of strengthening particles in at least one of the first and second metal structure 15, 20. In another embodiment, the concentration of strengthening particles in the welded joint 25 may range from at least 10% less than the concentration of strengthening particles in at least one of the first and second metal structure 15, 20 to as great as 10% more than the concentration of strengthening particles in at least one of the first and second metal structure 15, 20. In a further embodiment, the concentration of strengthening particles in the welded joint 25 may range from at least 5% less than the concentration of strengthening particles in at least one of the first and second metal structure 15, 20 to as great as 5% more than the concentration of strengthening particles in at least one of the first and second metal structure 15, 20. In one example, the concentration of strengthening particles in the welded joint 25 is equal to the concentration of strengthening particles in at least one of the first and second metal structure 15, 20.

In one example, at least one of the first and second metal structure 15, 20 is an oxide dispersion strengthened alloy composed of about 18.5 wt % to about 21.5 wt % chromium (Cr), about 3.75 wt % to about 5.75 wt % (Al), about 0.2 wt % to about 0.6 wt % titanium (Ti), about 0.3 wt % to about 0.7 wt % yttrium oxide ($Y_2O_3$), up to about 0.1 wt % carbon (C), up to about 0.15 wt % copper (Cu), up to about 0.30 wt % manganese (Mn), up to about 0.30 wt % cobalt (Co), up to about 0.5 wt % nickel (Ni), up to about 0.02 wt % phosphorus (P), and a balance of iron (Fe) and incidental impurities. In one example, the welded joint 25 is composed of about 18.5 wt % to about 21.5 wt % chromium (Cr), about 3.75 wt % to about 5.75 wt % (Al), about 0.2 wt % to about 0.6 wt % titanium (Ti), about 0.1 wt % to about 0.9 wt % yttrium oxide ($Y_2O_3$), up to about 0.1 wt % carbon (C), up to about 0.15 wt % copper (Cu), up to about 0.30 wt % manganese (Mn), up to about 0.30 wt % cobalt (Co), up to about 0.5 wt % nickel (Ni), up to about 0.02 wt % phosphorus (P), and a balance of iron (Fe) and incidental impurities.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed:
1. A method of welding comprising:
   forming a filler material of a first oxide dispersion strengthened metal, the first oxide dispersion strengthened metal having first strengthening particles that compensate for decreases in weld strength of friction stir welded oxide dispersion strengthened metals, wherein the first strengthening particles have a peak concentration diameter ranging from 2 nm to 70 nm;
   positioning the filler material between a first metal structure and a second metal structure each being comprised of at least a second oxide dispersion strengthened metal, wherein said filler material is a unitary structure that is positioned along an entirety of an interface to be welded between the first metal structure and the second metal structure,
   wherein the concentration of the first strengthening particles in said filler material is 5% to 25% greater than the concentration of second strengthening particles in said first and second metal structures; and friction welding the filler material, the first metal structure and the second metal structure to provide a weld, wherein said friction welding begins after the unitary structure of the filler material has been positioned along the entirety of the interface to be welded between the first metal structure and the second metal structure.

2. The method of claim 1, wherein at least one of the filler material, the first metal structure, and the second metal structure are comprised of at least one of a Ni-based material, a Cr-based material, an Al-based material, a Fe-based material, cobalt (Co)-based material, a Ti-based material, or a combination thereof.

3. The method of claim 1, wherein the first strengthening particles have a peak concentration diameter ranging from about 10 nm to about 30 nm.

4. The method of claim 3, wherein the at least a second oxide dispersion strengthened metal comprises second strengthening particles having a peak concentration diameter ranging from 2 nm to 1 micron.

5. The method of claim 4, wherein the at least one of the first strengthening particles and the second strengthening particles are comprised of yttrium (III) oxide ($Y_2O_3$), aluminum (III) oxide ($Al_2O_3$), hafnium (IV) oxide ($HfO_2$), lanthanum (III) oxide ($La_2O_3$), titanium oxide ($Ti_2O_3$), cerium(IV) oxide ($CeO_2$), and cerium(III) oxide ($Ce_2O_3$), or a combination thereof.

6. The method of claim 5, wherein the concentration of the second strengthening particles has a fractional volume that ranges from about 0.3% to about 5%.

7. The method of claim 5, wherein the concentration of the first strengthening particles is greater than the concentration of second strengthening particles by 10% to 15%.

8. The method of claim 5, wherein the weld comprises a combination of first strengthening particles and second strengthening particles that ranges from about 15% less to about 15% more than a concentration of second strengthening particles in an unwelded portion of the first and second metal structures.

9. A method of welding comprising:

positioning a filler material comprised of a first oxide dispersion strengthened metal between a first metal structure and a second metal structure, the first metal structure and the second metal structure being comprised of at least a second oxide dispersion strengthened metal having second strengthening particles with a peak concentration diameter ranging from 2 nm to 70 nm, wherein said filler material is a unitary structure that is positioned along an entirety of an interface to be welded between the first metal structure and the second metal structure, and the first oxide dispersion strengthened metal has a concentration of first strengthening particles that is 5% to 25% greater than a concentration of the second strengthening particles in the at least the second oxide dispersion strengthened metal; and friction welding the filler material, the first metal structure and the second metal structure to provide a weld joining the first metal structure to the second metal structure, wherein said friction welding begins after the unitary structure of the filler material has been positioned along the entirety of the interface to be welded between the first metal structure and the second metal structure.

10. The method of claim 9, wherein the concentration of the first strengthening particles compensates for the loss of second strengthening particles in the weld that would occur if the filler material was not present.

11. The method of claim 9, wherein at least one of the filler material, the first metal structure, and the second metal structure are comprised of at least one of a Ni-based material, a Cr-based material, an Al-based material, a Fe-based material, cobalt (Co)-based material, a Ti-based material, or a combination thereof.

12. The method of claim 9, wherein the first oxide dispersion strengthened metal and the at least the second oxide dispersion strengthened metal includes a strengthening particle having a peak concentration diameter ranging from about 10 nm to about 30 nm.

13. The method of claim, wherein the at least one of the first oxide dispersion metal and the second oxide dispersion strengthened metal comprises a first strengthening particle is an oxide comprised of yttrium (III) oxide ($Y_2O_3$), aluminum (III) oxide ($Al_2O_3$), hafnium (IV) oxide ($HfO_2$), lanthanum (III) oxide ($La_2O_3$), titanium oxide ($Ti_2O_3$), cerium(IV) oxide ($CeO_2$), and cerium(III) oxide ($Ce_2O_3$) or a combination thereof.

14. The method of claim 9, wherein the concentration of the second strengthening particles has a fractional volume that ranges from about 0.3% to about 5%.

15. The method of claim 9, wherein the concentration of the first strengthening particles is greater than the concentration of second strengthening particles by 10% to 15%.

16. The method of claim 9, wherein the weld comprises a combination of first strengthening particles and second strengthening particles that ranges from about 15% less to about 15% more than a concentration of second strengthening particles in an unwelded portion of the first and second metal structures.

17. The method of claim 9, wherein the filler material has a sidewall perpendicular to its base and the filler material extends an entire height of the first metal structure and the second metal structure.

18. The method of claim 9, wherein the positioning of the filler material between a first metal structure and a second metal structure comprises machining a ledge in the edge of the first metal structure and the second metal structure, and positioning the filler material within the ledge between the first metal structure and the second metal structure.

19. The method of claim 9, wherein the friction welding of the filler material, the first metal structure and the second metal structure to provide a weld comprises a friction stir weld tool including a pin.

20. The method of claim 9, wherein the rotation speed of the friction stir weld tool ranges from about 200 rotations per minute to about 2000 rotations per minute.

21. The method of claim 1, wherein said first and second metal structure are composed of an oxide dispersion strengthened alloy comprising chromium, aluminum, titanium, yttrium, carbon, copper, manganese, cobalt, nickel, phosphorus and iron.

22. The method of claim 1, wherein said first and second metal structure are composed of an oxide dispersion strengthened alloy comprising nickel, chromium, iron, carbon, aluminum, titanium and yttrium.

* * * * *